(12) United States Patent
Agbabian et al.

(10) Patent No.: US 8,429,734 B2
(45) Date of Patent: Apr. 23, 2013

(54) METHOD FOR DETECTING DNS REDIRECTS OR FRAUDULENT LOCAL CERTIFICATES FOR SSL SITES IN PHARMING/PHISHING SCHEMES BY REMOTE VALIDATION AND USING A CREDENTIAL MANAGER AND RECORDED CERTIFICATE ATTRIBUTES

(75) Inventors: Paul Agbabian, Los Angeles, CA (US); William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1348 days.

(21) Appl. No.: 11/831,843

(22) Filed: Jul. 31, 2007

(65) Prior Publication Data

US 2009/0037997 A1 Feb. 5, 2009

(51) Int. Cl.
*G06F 21/00* (2006.01)

(52) U.S. Cl.
USPC ............... 726/10; 380/232; 726/4; 726/19; 713/156; 713/175; 709/218; 455/410; 705/325

(58) Field of Classification Search ............... 726/5, 10
See application file for complete search history.

(56) References Cited

U.S. PATENT DOCUMENTS

| | | | | |
|---|---|---|---|---|
| 6,615,258 | B1* | 9/2003 | Barry et al. | 709/223 |
| 6,738,912 | B2* | 5/2004 | Buttiker | 726/10 |
| 7,117,360 | B1* | 10/2006 | Zhao | 713/158 |
| 2002/0116647 | A1* | 8/2002 | Mont et al. | 713/201 |
| 2004/0030887 | A1* | 2/2004 | Harrisville-Wolff et al. | 713/155 |
| 2005/0210296 | A1* | 9/2005 | Devine et al. | 713/201 |
| 2005/0278534 | A1* | 12/2005 | Nadalin et al. | 713/175 |
| 2006/0041754 | A1* | 2/2006 | Hind et al. | 713/176 |

(Continued)

FOREIGN PATENT DOCUMENTS

| | | |
|---|---|---|
| EP | 1 965 560 | 9/2008 |
| GB | 2 392 068 | 2/2004 |

OTHER PUBLICATIONS

Hayes, "The problem with multiple roots in Web browsers-certificate masquerading", Enabling Technologies: Infrastructure for Collaborative Enterprises, 1998. (Wet Ice '98) Proceedings., Seventh IEEE International Workshops on Date of Conference: Jun. 17-19, 1998, pp.: 306 - 311.*

(Continued)

*Primary Examiner* — Morshed Mehedi
(74) *Attorney, Agent, or Firm* — McKay and Hodgson, LLP; Serge J. Hodgson; Sean P. Lewis

(57) ABSTRACT

Certificate information associated with a received certificate, such as a Secure Sockets Layer (SSL) certificate is stored in a trusted local cache and/or in one or more remote trusted sources, such as a single remote trusted source and/or a trusted peer network. When a site certificate is received on a host computer system, certificate information associated with the received site certificate is obtained and compared with the stored certificate information to determine whether or not the site certificate indicates malicious activity, such as a malicious DNS redirection or a fraudulent local certificate. When a site certificate is not found indicative of malicious activity, the site certificate is released. Alternatively, when a site certificates is found indicative of malicious activity protective action is taken. In some embodiments, a user's log-in credentials are automatically obtained from a trusted local cache and automatically submitted to a web site.

16 Claims, 5 Drawing Sheets

U.S. PATENT DOCUMENTS

| | | | |
|---|---|---|---|
| 2006/0143700 A1* | 6/2006 | Herrmann | 726/14 |
| 2006/0277596 A1* | 12/2006 | Calvert et al. | 726/3 |
| 2007/0143836 A1* | 6/2007 | Bowers et al. | 726/10 |
| 2007/0180225 A1* | 8/2007 | Schmidt | 713/152 |
| 2008/0034428 A1* | 2/2008 | Bejar et al. | 726/23 |
| 2008/0046968 A1* | 2/2008 | Cline et al. | 726/2 |
| 2008/0052026 A1* | 2/2008 | Amidon et al. | 702/104 |
| 2008/0244712 A1* | 10/2008 | Kitada et al. | 726/5 |

OTHER PUBLICATIONS

"Browser Extension Defeats Internet Eavesdropping", pp. 1-18 [online]. Retrieved on Aug. 27, 2008 from the Internet: <Url:http://it.slashdot.org/article.pl?no_d2=1&sid=08/08/25/1545246>. no author provided.

* cited by examiner

METHOD FOR DETECTING DNS REDIRECTS OR FRAUDULENT LOCAL CERTIFICATES FOR SSL SITES IN PHARMING/PHISHING SCHEMES BY REMOTE VALIDATION AND USING A CREDENTIAL MANAGER AND RECORDED CERTIFICATE ATTRIBUTES

BACKGROUND OF THE INVENTION

1. Field of the Invention

The present invention relates to computer systems. More particularly, the present invention relates to computer security.

2. Description of Related Art

Secure protocols, such as the Secure Sockets Layer (SSL) protocol, are widely utilized to protect data transmitted on the Internet, such as between a user's application and a web site server. Often, the connection is secured by using a certificate returned from the web site to share a key with the web browser of the user's computer system. In some instances, a user is prompted for input of one or more user credentials, such as a username and password and to validate the authenticity of the server. In other instances, the only user interaction may be to approve the certificate returned from the web site.

The web browser typically checks to see if the signer of the certificate matches a known signer, e.g., a Certificate Authority, stored in a certificate, such as a certificate installed in the web browser's certificate store. If the signer of the certificate matches a known signer in the certificate, the web browser allows the connection. If the signer of the certificate does not match a known signer, the web browser typically generates an alert notification to the user, so that the user can determine whether or not to continue the connection.

Thus, when an alert notification is not generated by a web browser, a user typically assumes the web site was legitimate and the correct web site, i.e., is not a malicious web site. Unfortunately, new computer attacks are resulting in the redirection of users to malicious sites over secure connections such that no alert notifications are generated by the web browser, and the user is unaware that the web site may be a malicious web site.

SUMMARY OF THE INVENTION

In accordance with one embodiment of the invention, a method includes intercepting an SSL certificate received on a host computer system and obtaining certificate information associated with the SSL certificate. A trusted local cache of previously loaded certificate information is queried for information corresponding to the SSL certificate received in the current certificate exchange.

A determination is made whether or not the locally stored certificate information is present in the trusted local cache. When the locally stored certificate information is present, the locally stored certificate information is obtained and a first comparison is performed in which at least a portion of the certificate information is compared with at least a portion of the locally stored certificate information.

A determination is made whether or not the SSL certificate is verified based upon the first comparison. Upon a determination that the SSL certificate is verified, it is assumed the SSL certificate is not indicative of a malicious redirect or a fraudulent local certificate, and the SSL certificate is released. Alternatively, upon a determination that the SSL certificate is not verified based upon the comparison, it is assumed the SSL certificate is indicative of a malicious redirect or a fraudulent local certificate and protective action is taken.

In instances in which the locally stored certificate information is not present in the trusted local cache, at least one remote trusted source is queried for remotely stored certificate information corresponding to the SSL certificate. The remotely stored certificate information is obtained and at least a portion of the certificate information is compared with at least a portion of the remotely stored certificate information.

A determination is made whether or not the SSL certificate is verified based upon the comparison. When the SSL certificate is verified, the certificate information is stored as an entry corresponding to the SSL certificate in the trusted local cache, and the SSL certificate is released. Alternatively, when the SSL certificate is not verified, protective action is taken.

In a further embodiment, upon a determination that the certificate information is not verified when compared to the locally stored certificate information in the trusted local cache, prior to taking protective action, at least one remote trusted source is queried for remotely stored certificate information corresponding to the certificate information. The remotely stored certificate information is obtained and a second comparison is performed, the second comparison comparing at least a portion of the certificate information with at least a portion of the remotely stored certificate information.

A determination is made whether or not the SSL certificate is verified based upon the second comparison. When the SSL certificate is verified based upon the second comparison, the SSL certificate is released, and the locally stored certificate information in the trusted local cache is updated to reflect the remotely stored certificate information. Alternatively, when the SSL certificate is not verified, protective action is taken.

In a still further embodiment, a log-in form from a web site is intercepted prior to display to a user on a host computer system, the log-in form including one or more user credential fields for input of one or more requested user credentials. A document object model (DOM) object is automatically constructed including the log-in form and having the one or more user credential fields.

The one or more user credentials are automatically obtained from a secure local credential store having one or more stored user credentials corresponding to the one or more user credential fields. The one or more stored user credentials are automatically embedded in the one or more user credential fields in the DOM, and the DOM including the one or more stored user credentials is submitted to a web site.

Embodiments described herein are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Drive-by pharming attacks can compromise a home router and change the DNS server addresses for router clients, leading to redirection to phishing sites or other malicious activity. For example, a spam or phishing attack can mislead a user into loading a new certificate, i.e., a malicious certificate, into a certificate store, such as one maintained by a web browser. Once the malicious certificate is installed, an attacker's DNS redirected site can return a certificate that mimics an SSL certificate sufficiently so that the web browser does not generate an alert notification, e.g., the certificate provided by the malicious site will have a signer that corresponds to the known signer of the malicious certificate.

Further, a user's credentials can be maliciously obtained by spyware installed on the user's computer system when a user manually enters requested user credentials, such as a username and password, into a log-in page. Also, where a user is redirected to a fraudulent web site, the user can enter user credentials into a fraudulent log-in page returned by the fraudulent web site and the user credentials are transmitted to the fraudulent web site.

Embodiments in accordance with the invention detect when Uniform Resource Locators (URLs) using SSL authentication are redirected, such as by Domain Name Server (DNS) compromise or fraudulent local certificates, by validating certificate information associated with the site certificate with stored certificate information stored in a trusted local cache and/or in one or more remote trusted sources, such as a single remote trusted source and/or a trusted peer network.

More particularly, in one embodiment, the URL associated with a returned SSL certificate together with one or more user credentials and/or one or more certificate attributes are compared to stored certificate information to determine whether or not the SSL certificate indicates malicious activity. Thus, even though a web browser may accept an SSL certificate based on the certificate signer agreeing with a stored certificate, such as in the web browser's certificate store, embodiments in accordance with the present invention, obtain and evaluate other certificate specific information to determine whether or not malicious activity is indicated.

Further, additional embodiments in accordance with the invention automatically obtain a user's credentials from a trusted local cache and submit a log-in form with a user's credentials, such as a username and password, to a web site. As the user does not manually fill in the log-in form, the user's credentials are protected against spyware, such as screen scrapers and keyloggers.

Figure 2:
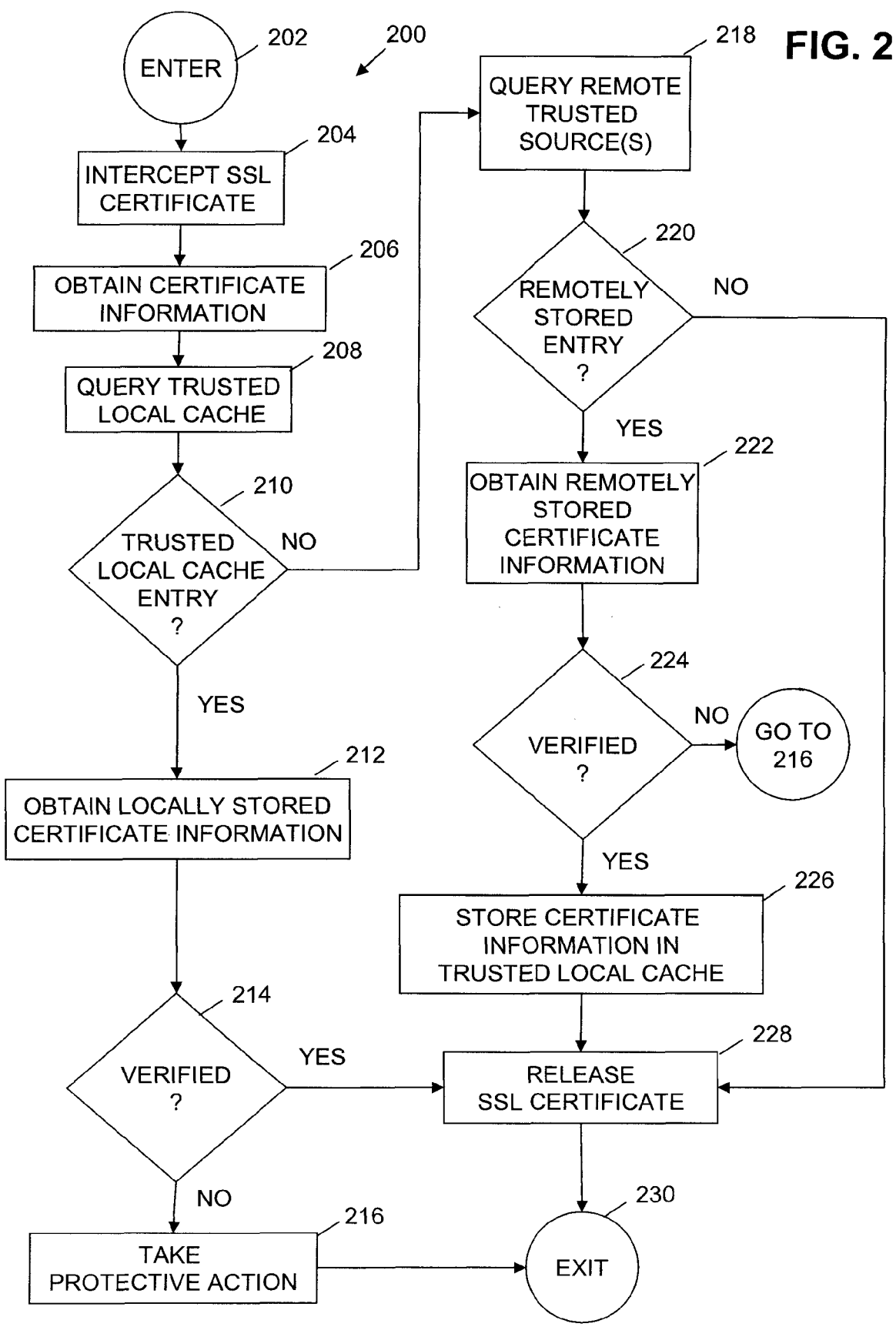
FIG. 2 illustrates a flow diagram of a method for detecting fraudulent redirects and/or fraudulent local certificates in accordance with one embodiment of the invention.

Referring now generally to FIG. 2, in one embodiment, an SSL certificate returned from a web site, i.e., from a web site server, is intercepted on a host computer system (operation 204) and certificate information associated with the SSL certificate is obtained (operation 206). A trusted local cache is queried for locally stored certificate information corresponding to the SSL certificate (operation 208).

A determination is made whether or not locally stored certificate information corresponding to the SSL certificate is present in the trusted local cache (operation 210). When an entry in the trusted local cache having locally stored certificate information corresponding to the SSL certificate is present in the trusted local cache ("YES"), the locally stored certificate information in the trusted cache is obtained (operation 212) and compared with the certificate information of the SSL certificate to determine if the SSL certificate is verified (operation 214). More particularly, in one embodiment, the URL associated with the certificate together with one or more user credentials and/or one or more certificate attributes are compared.

If the SSL certificate is verified ("YES"), the SSL certificate is released, such as for completion to a web browser (operation 226). Alternatively, if the SSL certificate is not verified ("NO"), it is assumed the SSL certificate is the result of a malicious redirection or a fraudulent local certificate and protective action is taken, such as generating an alert to the user or another application, or aborting the transaction (operation 216).

In instances in which an entry having stored certificate information corresponding to the SSL certificate is not present in the trusted local cache ("NO", operation 210), one or more remote trusted source(s) is queried for remotely stored certificate information corresponding to the SSL certificate (operation 218). A determination is made whether or not remotely stored certificate information corresponding to the SSL certificate is present at a remote trusted source (operation 220). When an entry having stored certificate information corresponding to the SSL certificate is present in the remote trusted source ("YES"), the stored certificate information in the remote trusted source is obtained (operation 222) and compared with the certificate information of the SSL certificate to determine if the SSL certificate is verified (operation 224).

If the SSL certificate is verified ("YES"), the remotely stored certificate information is stored in the trusted local cache (operation 226) and the SSL certificate is released (operation 228). Alternatively, if the SSL certificate is not verified ("NO"), protective action is taken (operation 216).

In instances in which an entry having stored certificate information corresponding to the SSL certificate is not present in the remote trusted source ("NO", operation 220), the SSL certificate is released (operation 228), for example to allow browser evaluation of the certificate.

In some instances, locally stored certificate information present in the trusted local cache may be outdated resulting in a non-verification of a currently valid SSL certificate when compared with the locally stored certificate information in the trusted cache. Thus, a further embodiment enables an SSL certificate that is valid to be remotely verified when the trusted local cache is outdated and results in a non-verification.

Figure 3:
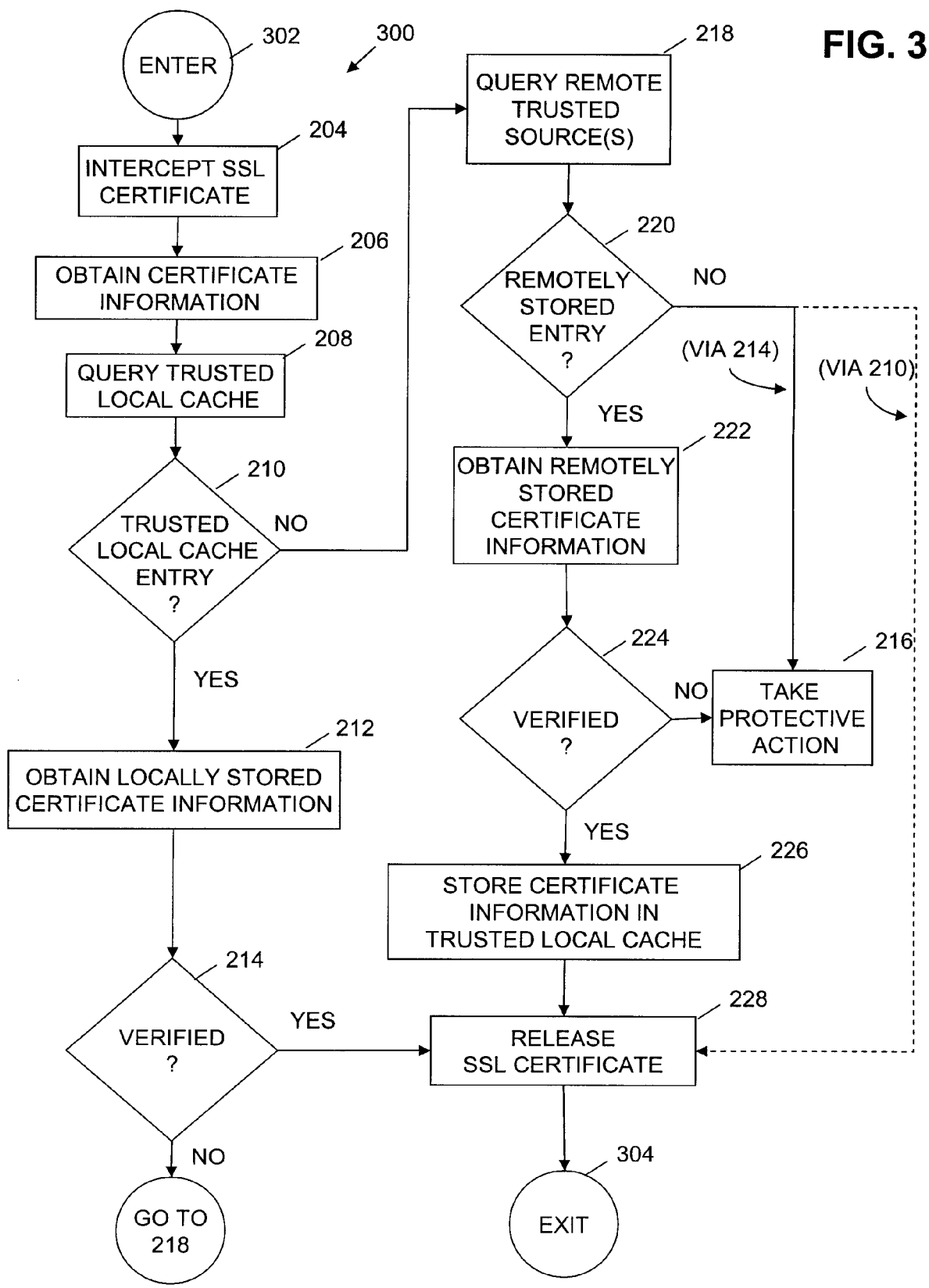
FIG. 3 illustrates a flow diagram of a method for detecting fraudulent redirects and/or fraudulent local SSL certificates in accordance with another embodiment of the invention.

Referring generally to FIG. 3, when locally stored certificate information in the trusted cache corresponding to the SSL certificate is found in the trusted local cache ("YES", operation 210), but the certificate information of the SSL certificate is not verified ("NO", operation 214), an additional verification process is performed with remotely stored certificate information obtained from one or more remote trusted sources, such as a single remote trusted source and/or a remote trusted peer group. The remote trusted source is queried for remotely stored certificate information corresponding to the SSL certificate (operation 218).

In instances in which an entry having stored certificate information corresponding to the SSL certificate is not present in the trusted local cache ("NO", operation 210), one or more remote trusted source(s) is queried for remotely stored certificate information corresponding to the SSL certificate (operation 218). A determination is made whether or not remotely stored certificate information corresponding to the SSL certificate is present at a remote trusted source (operation 220). When an entry in the remote trusted source having remotely stored certificate information corresponding to the SSL certificate is present ("YES"), the remotely stored certificate information in the remote trusted source is obtained (operation 222) and compared with the certificate information of the SSL certificate to determine if the SSL certificate is verified (operation 224).

If the SSL certificate is verified based upon the comparison with the remotely stored certificate information ("YES"), the locally stored certificate information in the trusted local cache is updated to reflect the remotely stored certificate information (operation 226) and the SSL certificate is released (operation 228). Alternatively, if the SSL certificate is not verified ("NO"), protective action is taken (operation 216).

In instances in which an entry having stored certificate information corresponding to the SSL certificate is not present in the remote trusted source ("NO", operation 220), protective action is taken (operation 216), as the SSL certificate failed verification by the trusted local cache.

Figure 5:
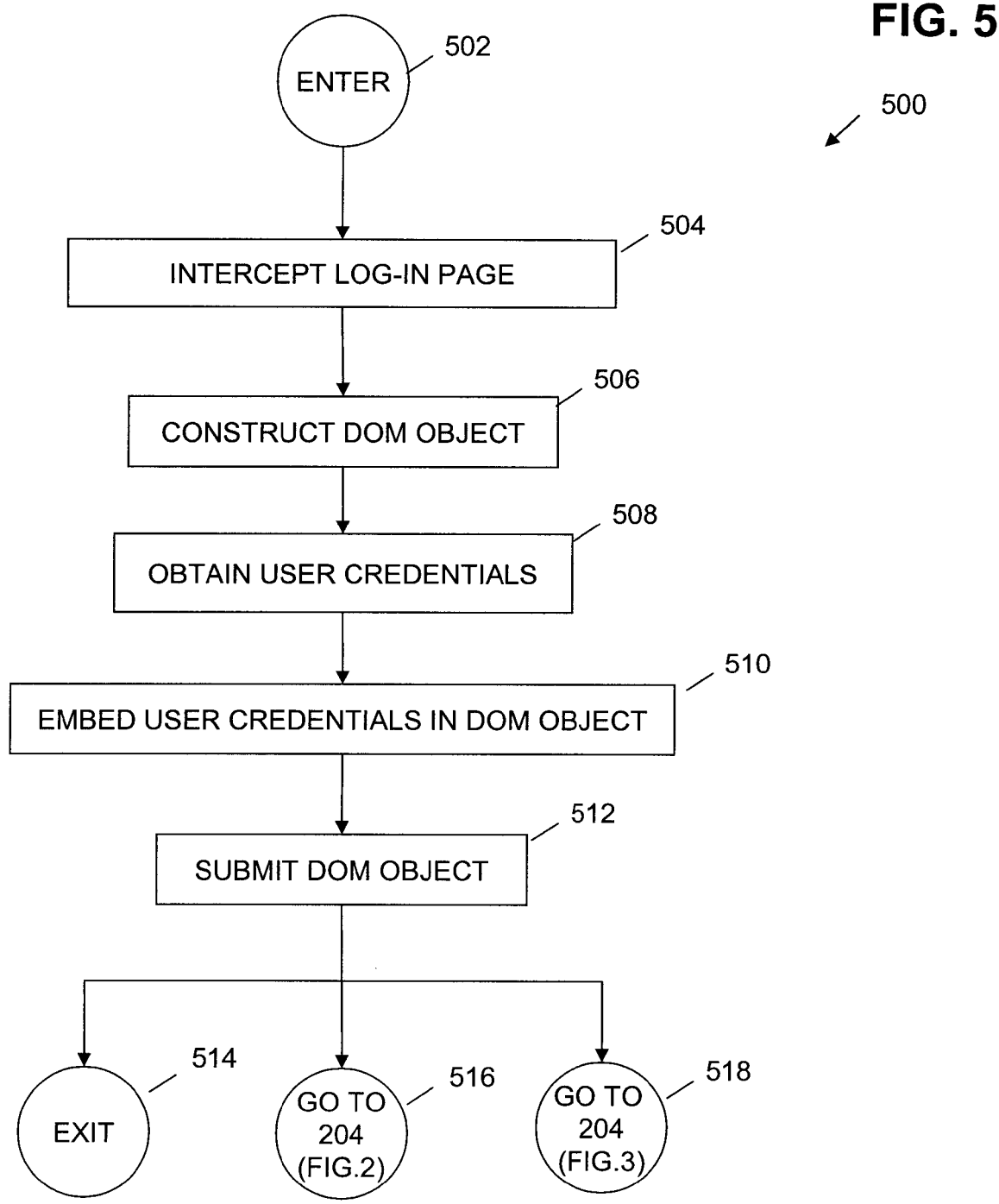
FIG. 5 illustrates a flow diagram of a method for automatically logging-in to a web site utilizing user credentials stored in the trusted local cache of FIG. 1 in accordance with another embodiment of the invention.

In a further embodiment, a user is automatically logged-in to a secure site to protect against compromise of the user's credentials such as by spyware. Referring generally to FIG. 5, in one embodiment, a log-in page is automatically intercepted prior to display to a user (operation 504). A Data Object Model (DOM) object is constructed including the log-in page and having user credential fields for submission of one or more user credentials (operation 506).

The user's credentials corresponding to the user credential fields in the log-in form are obtained from the trusted local cache (operation 508) and automatically embedded in the user credential fields in the DOM object (operation 510). The DOM object including the user credentials are then automatically submitted to a web site (operation 512). Optionally, the method can be exited (operation 514), or utilized with method 200 (operation 516), or utilized with method 300 (operation 518).

Figure 1:
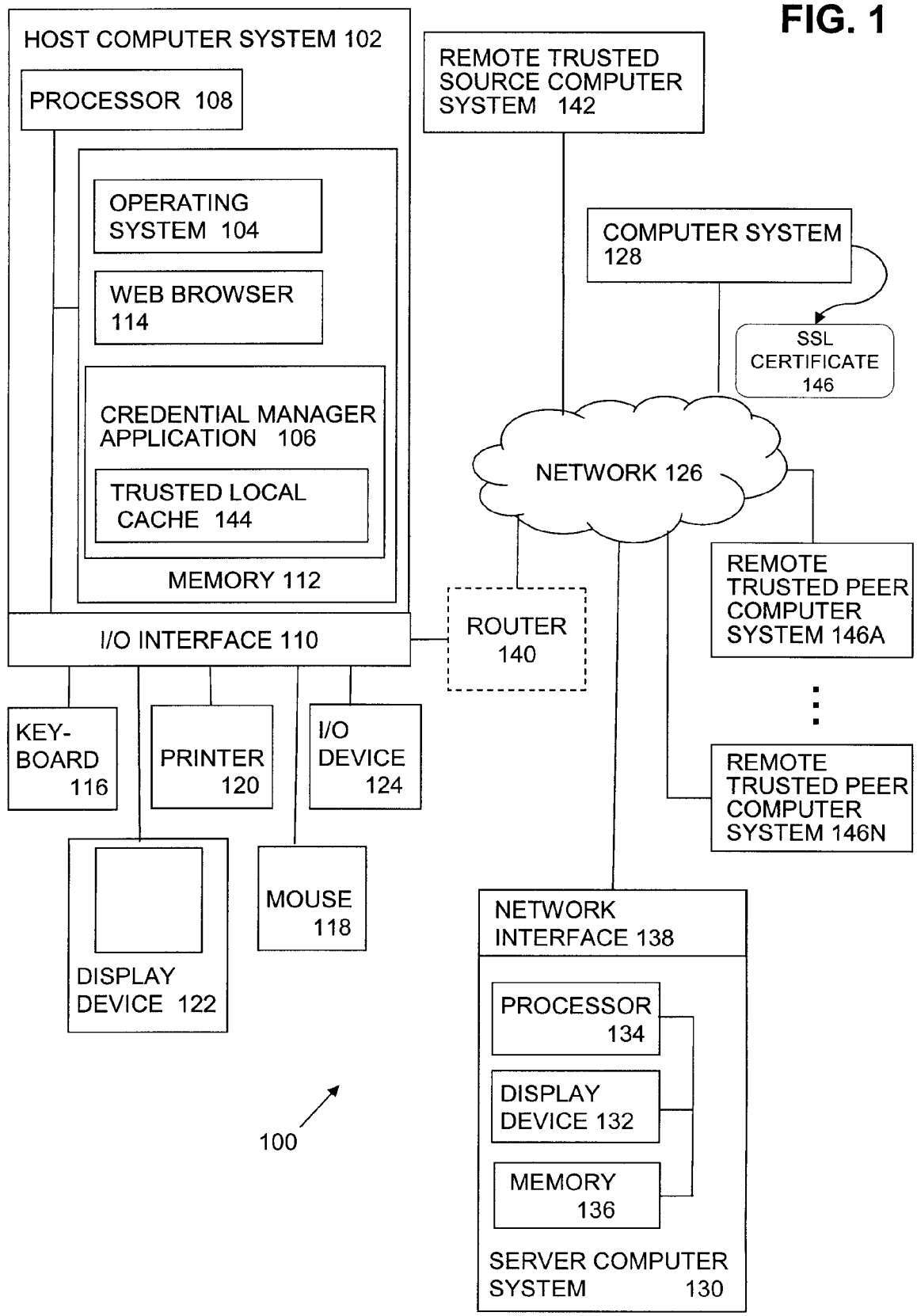
FIG. 1 illustrates a diagram of a computer system that includes a credential manager application executing on a host computer system in accordance with one embodiment of the present invention.

Referring now to FIG. 1, FIG. 1 is a diagram of a computer system 100 that includes a credential manager application 106 executing on a host computer system 102, e.g., a first computer system, in accordance with one embodiment of the present invention. Host computer system 102, sometimes called a user device, typically includes a central processing unit (CPU) 108, hereinafter processor 108, an input output (I/O) interface 110, and a memory 112, including an operating system 104.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, credential manager application 106 is loaded into host computer system 102 via I/O device 124, such as from a CD, DVD or floppy disk containing credential manager application 106.

In the present embodiment, host computer system 102 is coupled via network 126 to one or more other computer systems, such as a server computer system 130, a computer system 128, and one or more remote trusted sources, such as a remote trusted source computer system 142 and remote trusted peer computer systems 146A-146N. Network 126 can be any network or network system that is of interest to a user. Server computer system 130, e.g., a second computer system, typically includes a display device 132, a processor 134, a memory 136, and a network interface 138.

In some embodiments, host computer system 102 is coupled to network 126 through a router 140 that is coupled to network 126. Router 140 is any one of a number of conventional routers, such as a home broadband router, and the particular router is not essential to this embodiment.

In one embodiment, computer system 128 can be a secure computer system that utilizes a site certificate, such as an SSL certificate. In some embodiments, computer system 128 can further be a malicious web site that host computer system 102 is redirected to due to a DNS compromise of router 140. In some embodiments, computer system 128 utilizes a fraudulent certificate, such as a fraudulent SSL certificate that corresponds to a fraudulent certificate maliciously installed in a certificate store (not shown) of web browser 114.

Herein, in one embodiment, malicious code is defined as any computer program, module, set of modules, or code that enters a computer system environment without an authorized user's knowledge and/or without an authorized user's consent. Further herein, malicious activity is any activity resulting from the execution of malicious code. Additionally herein, a malicious site is any web site involved in the installation, execution, and/or utilization of malicious code or malicious activity.

In one embodiment, remote trusted source computer system 142 includes remotely stored certificate information corresponding to separate SSL certificates. Thus, remote trusted source computer system 142 includes or has access to a trusted remote source cache (not shown) which includes one or more entries, each entry having stored certificate information associated with an SSL certificate.

In one embodiment, the stored certificate information includes a URL together with one or more user credentials and/or one or more certificate attributes. In one embodiment, remote trusted source computer system 142 is utilized by credential manager application 106 to provide remotely stored certificate information.

In one embodiment, remote trusted source computer system 142 utilizes a certificate signed by a specific root to prevent an attack, such as a DNS redirection or fraudulent local certificate, from being played against itself. Thus, in one embodiment, a connection between host computer system 102 and remote trusted source computer system 142 is a secure connection.

In one embodiment, each of remote trusted peer computer systems 146A-146N includes remotely stored certificate information corresponding to separate SSL certificates. Thus, each of remote trusted peer computer systems 146A-146N includes or has access to a trusted peer remote source cache (not shown) which includes one or more entries, each entry having stored certificate information associated with an SSL certificate. In one embodiment, the stored certificate information includes a URL together with one or more user credentials and/or one or more certificate attributes.

In one embodiment, one or more of remote trusted peer computer systems 146A-146N is utilized by credential manager application 106 to provide remotely stored certificate information. In one embodiment, remote trusted peer computer systems 146A-146N are connected to host computer system 102 as part of a remote trusted peer-to-peer (P2P) network.

If the one or more of remote trusted peer computer systems 146A-146N are geographically near to host computer system 102, legitimate geographic differences in site and credential details should be minimal, as geographically co-located peers will typically receive the same certificate information for a particular SSL certificate. Thus, comparisons between certificate information among remote trusted peer computer systems 146A-146N and/or trusted local cache 144 can be used to detect legitimate local variances in the certificate information as well as DNS redirections due to a pharming attack, for example when the certificate information is different from the remotely stored certificate information returned by the remote trusted source computer system 142 and/or remote trusted peer computer systems 146A-146N.

In one embodiment, remote trusted source computer system 142, computer system 128, and remote trusted peer computer system 146A-146N are similar to host computer system 102 and/or server computer system 130, for example, include a central processing unit, an input output (I/O) interface, and a memory, and may further include standard devices like a keyboard, a mouse, a printer, a display device and an I/O device(s). The various hardware components of the above computer systems are not illustrated to avoid detracting from the principles of the invention.

In one embodiment, memory 112 includes credential manager application 106 and a web browser application 114. Web browser application 114 typically renders web page content, including log-in pages, and in connections utilizing secure protocols, web browser 114 receives site certificates, such as SSL certificates.

Web browser 114 typically maintains or has access to a certificate store that includes stored certificates which identify known signers for particular certificates, e.g., SSL certificates. Where an SSL certificate is determined to not include a known signer based on the comparison with the known signer identified in the stored certificate, web browser 114 typically provides an alert notification to the user.

Web browser application 114 is any one of a number of conventional web browser applications, and the particular web browser application is not essential to this embodiment. Conventional web browsers are well known to those of skill in the art and are not further described herein to avoid detracting from the principles of the invention.

In the present embodiments, credential manager application 106 detects DNS redirects or fraudulent local certificates for SSL web sites in pharming/phishing schemes. In one embodiment, credential manager application 106 intercepts an SSL certificate and obtains certificate information associated with the SSL certificate. In one embodiment, the certificate information includes the URL of the web site together with one or more certificate attributes, such as the subject, the issuer, and the last known good signer, and/or one or more user credentials, such as a username and a user password.

As further described herein, the certificate information is compared with corresponding stored certificate information obtained from a local trusted cache maintained by credential manager 106 and/or from a remote trusted source for indications of malicious activity, such as a DNS redirect or a fraudulent local certificate. Credential manager application 106 maintains a trusted local cache 144 which stores one or more entries of certificate information, where each entry includes certificate information associated with a particular SSL certificate.

In one embodiment, trusted local cache 144 is part of credential manager application 106, however, in other embodiments, trusted local cache 144 can be separate from but accessible by credential manager application 106. One embodiment, of trusted local cache 144 is further described herein with reference to FIG. 4.

In some embodiments, credential manager 106 also automatically logs a user into a secure web site. In one embodiment, credential manager 106 intercepts log-in page requests received from a site prior to display to a user and constructs a DOM object including the log-in page with user credential fields. Credential manager 106 obtains user credentials requested in the log-in page from trusted local cache 144 and automatically fills in the requested user credentials and automatically submits the completed DOM object including the log-in page having the user credentials to the web site. In some embodiments, the submission is made in a separate window.

In various embodiments, network interface 138 and I/O interface 110 include analog modems, digital modems, or a network interface card. The particular type of and configuration of host computer system 102, computer system 128, remote trusted source computer system 142, remote trusted peer computer systems 146A-146N, and server computer system 130 are not essential to this embodiment of the present invention.

Herein embodiments in accordance with the invention are described with reference to connections secured utilizing an SSL certificate. However, those of skill in the art can understand that the invention can also be applied to other secure connections utilizing different certificates.

FIG. 2 illustrates a flow diagram of a method 200 for detecting fraudulent redirects and/or fraudulent local certificates in accordance with one embodiment of the invention. Referring now to FIGS. 1 and 2 together, in one embodiment, execution of credential manager application 106 by processor 108 results in the operations of method 200 as described below. Method 200 is entered at an ENTER operation 202, wherein in one embodiment, an SSL certificate from a web site is returned to host computer system 102, such as in response to a user log-in, and processing transitions to an INTERCEPT SSL CERTIFICATE 204.

In INTERCEPT SSL CERTIFICATE operation 204, an SSL certificate returned from a web site is intercepted by credential manager application 106. For example, in one embodiment, a user on host computer system 102 accesses computer system 128. Computer system 128 returns an SSL certificate, such as SSL certificate 146, to host computer system 102 that is intercepted by credential manager application 106.

In one embodiment, returned SSL certificate 146 is intercepted by credential manager application 106 prior to SSL certificate 146 being received by web browser 114. SSL certificate 146 can be intercepted using any of a wide variety of intercept mechanisms well known to those of skill in the art, such as by utilizing proxy or hooking techniques. From INTERCEPT SSL CERTIFICATE operation 204, processing transitions to an OBTAIN CERTIFICATE INFORMATION operation 206.

In OBTAIN CERTIFICATE INFORMATION operation 206, certificate information associated with the SSL certificate is obtained. For example, in one embodiment, certificate information includes, but is not limited to, one or more of a Uniform Resource Locator (URL), one or more user credentials, and/or one or more certificate attributes. In other embodiments, more, fewer, or different certificate information associated with the SSL certificate can be obtained.

In one embodiment, the URL is the URL of the web site providing the SSL certificate. Examples of user credentials include, but are not limited to a username and a password. Examples of certificate attributes include but are not limited to the subject of the SSL certificate, the issuer of the SSL certificate, and the last known good signer of the SSL certificate. From OBTAIN CERTIFICATE INFORMATION operation 206, processing transitions to a QUERY TRUSTED LOCAL CACHE operation 208.

In QUERY TRUSTED LOCAL CACHE operation 208, the trusted local cache, e.g., trusted local cache 144, maintained by credential manager application 106 is queried for stored certificate information corresponding to the SSL certificate intercepted in operation 204, e.g., SSL certificate 146. In particular, in one embodiment, trusted local cache 144 is queried for an entry having a URL that matches the URL of SSL certificate 146. In other embodiments, other identifying information can be used to determine whether or not certificate information corresponding to returned SSL certificate 146 is present in trusted local cache 144. From QUERY TRUSTED LOCAL CACHE operation 208, processing transitions to a TRUSTED LOCAL CACHE ENTRY check operation 210.

In TRUSTED LOCAL CACHE ENTRY check operation 210, a determination is made whether or not an entry corresponding to returned SSL certificate 146 is present in trusted local cache 144. For example, in one embodiment, a determination is made whether or not an entry having a URL that matches the URL of SSL certificate 146 is present in trusted local cache 144.

In one embodiment, if an entry corresponding to SSL certificate 146 is not present in trusted local cache 144 ("NO"), information corresponding to SSL certificate 146 from an earlier visit to the web site, if any, has not been stored to trusted local cache 144. In this instance, in one embodiment, processing transitions from TRUSTED LOCAL CACHE ENTRY check operation 210 to a QUERY REMOTE TRUSTED SOURCE(S) check operation 218.

In QUERY REMOTE TRUSTED SOURCE(S) operation 218, one or more remote trusted sources are queried for stored certificate information associated with the SSL certificate, e.g., SSL certificate 146. In one embodiment a single remote trusted source, such as remote trusted source computer system 142, is queried.

In one embodiment, the connection from credential manager application 106 on host computer system 102 to remote trusted source computer system 142 uses a certificate signed by a known specific root. Thus, even if an attack results in a malicious redirect away from remote trusted source 142, the returned SSL certificate will not be that of the known specific root and an alert can be generated.

Alternatively, or additionally, the remote trusted source can be one or more remote trusted peers in a (peer-to-peer) P2P network, such as one or more of remote trusted peer computer systems 146A-146N (FIG. 1). If the remote trusted peers are geographically nearby host computer system 102, then legitimate geographic differences in site and certificate details should not affect the verification.

Comparisons between certificate and site details amongst remote trusted sources can also be used both to detect legitimate local variances as well compromised responses due to a pharming attacks, for example, where the returned SSL certificate is different from the certificate returned by the remote trusted sources. From QUERY REMOTE TRUSTED SOURCE(S) operation 218, processing transitions to a REMOTELY STORED ENTRY check operation 220.

In REMOTELY STORED ENTRY check operation 220, a determination is made whether or not an entry corresponding to returned SSL certificate 146 is present in one or more remote trusted sources, such as in a cache of remote trusted source computer system 142 and/or one or more of remote trusted peer computer systems 146A-146N. For example, in one embodiment, a determination is made whether or not an entry having a URL that matches the URL of SSL certificate 146 is present in remote trusted source computer system 142 and/or remote trusted peer computer systems 146A-146N.

In one embodiment, if an entry corresponding to SSL certificate 146 is not present in remote trusted source computer system 146 and/or one or more of remote trusted peer computer systems 146A-146N ("NO"), processing transitions from REMOTELY STORED ENTRY check operation 220 to a RELEASE SSL CERTIFICATE operation 228, further described herein, for example to allow browser evaluation of the certificate. Alternatively, in one embodiment if an entry corresponding to SSL certificate 146 is present in remote trusted source computer system 146 and/or one or more of remote trusted peer computer systems 146A-146N ("YES"), from REMOTELY STORED ENTRY check operation 220 processing transitions to an OBTAIN REMOTELY STORED CERTIFICATE INFORMATION operation 222.

In OBTAIN REMOTELY STORED CERTIFICATE INFORMATION operation 222, the stored certificate information corresponding to the SSL certificate is obtained from one or more of the remote trusted sources. Herein in one embodiment, stored certificate information obtained from remote trusted sources, such as remote trusted source computer system 142 and remote trusted peer computer systems 146A-146N, is termed remotely stored certificate information.

For example, in one embodiment, the remotely stored certificate information includes, but is not limited to a URL, one or more user credentials, and/or one or more certificate attributes. In other embodiments, more, fewer, or different remotely stored certificate information associated with the SSL certificate can be obtained.

In one embodiment, the URL is the URL of a web site. Examples of user credentials include, but are not limited to a username and a password. Examples of certificate attributes include but are not limited to the subject of the SSL certificate, the issuer of the SSL certificate, and the last known good signer of the SSL certificate. From OBTAIN REMOTELY STORED CERTIFICATE INFORMATION operation 222, processing transitions to a VERIFIED check operation 224.

In VERIFIED check operation 224, a determination is made whether or not the certificate information associated with SSL certificate 146 matches, or is otherwise verifiable by, the remotely stored certificate information obtained from the remote trusted source(s) in operation 222. For example, in one embodiment, the user credentials, e.g., username and password, and the certificate attributes, e.g., the subject, issuer, and last known good signer attributes, are each compared to corresponding information obtained from the remote trusted source(s).

In one embodiment, if the certificate information associated with SSL certificate 146 matches, or is otherwise verified by, the remotely stored certificate information obtained from the remote trusted source(s), SSL certificate 146 is verified and is assumed not to be the result of a malicious redirection and/or not a fraudulent local certificate. Alternatively, in one embodiment, if the certificate information associated with returned SSL certificate 146 does not match, or is otherwise not verified by, the remotely stored certificate information obtained from the remote trusted source(s), SSL certificate 146 is not verified and is assumed to be the result of a malicious redirection and/or a fraudulent local certificate. If SSL certificate 146 is not verified ("NO"), from VERIFIED check operation 224, processing transitions to a TAKE PROTECTIVE ACTION operation 216, further described herein.

Referring again to VERIFIED check operation 224, alternatively, if SSL certificate 146 is verified ("YES"), from VERIFIED check operation 224, processing transitions to a STORE CERTIFICATE INFORMATION IN TRUSTED LOCAL CACHE operation 226.

In STORE CERTIFICATE INFORMATION IN TRUSTED LOCAL CACHE OPERATION 226, an entry associated with the SSL certificate is generated and stored in trusted local cache 144. For example, in one embodiment, the URL associated with the SSL certificate, the user credentials, and the certificate attributes are stored as an entry in trusted local cache 144. From STORE CERTIFICATE INFORMATION IN TRUSTED LOCAL CACHE operation 226, processing transitions to a RELEASE SSL CERTIFICATE operation 228.

In RELEASE SSL CERTIFICATE operation 228, the SSL certificate intercepted in operation 204 is released, and allowed to complete. For example, in one embodiment, in instances in which SSL certificate 146 is intercepted prior to receipt by web browser 114, SSL certificate 146 is allowed to proceed to web browser 114. From RELEASE SSL CERTIFICATE operation 228, processing transitions to an EXIT operation 230, with processing exiting method 200 or returning to operation 204 on receipt of a next returned SSL certificate.

Referring now back again to TRUSTED LOCAL CACHE ENTRY check operation 210, alternatively, in one embodiment, if an entry corresponding to the returned SSL certificate is present in trusted local cache 144 ("YES"), processing transitions from TRUSTED LOCAL CACHE ENTRY check operation 210 to an OBTAIN LOCALLY STORED CERTIFICATE INFORMATION operation 212.

In OBTAIN LOCALLY STORED CERTIFICATE INFORMATION operation 212, the locally stored certificate information in the trusted local cache corresponding to the SSL certificate is obtained from trusted local cache 144. Herein in one embodiment, stored certificate information obtained from trusted local cache 144 is termed locally stored certificate information.

For example, in one embodiment, locally stored certificate information in the trusted local cache includes, but is not limited to, a URL, one or more user credentials, and/or one or more certificate attributes. In other embodiments, more, fewer, or different locally stored certificate information in the trusted local cache associated with the SSL certificate can be obtained.

In one embodiment, the URL is the URL of a web site. Examples of user credentials include, but are not limited to a username and a password. Examples of certificate attributes include but are not limited to the subject of the SSL certificate, the issuer of the SSL certificate, and the last known good signer of the SSL certificate. From OBTAIN LOCALLY STORED CERTIFICATE INFORMATION operation 212, processing transitions to a VERIFIED check operation 214.

In VERIFIED operation 214, a determination is made whether or not the certificate information associated with returned SSL certificate matches, or is otherwise verifiable by, the locally stored certificate information obtained from trusted local cache 144. For example, in one embodiment, the user credentials, e.g., username and password, and the certificate attributes, e.g., the subject, issuer, and last known good signer attributes, are each compared to corresponding information in the locally stored certificate information of the trusted local cache. In one embodiment, if the certificate information associated with returned SSL certificate 146 matches, or is otherwise verified by, the locally stored certificate information obtained from trusted local cache 144, returned SSL certificate 146 is verified, i.e., is assumed not to be the result of a malicious redirection and/or not a fraudulent local certificate.

Alternatively, in one embodiment, if the certificate information associated with returned SSL certificate 146 does not match the locally stored certificate information obtained from trusted local cache 144, SSL certificate 146 is not verified and is assumed to be an SSL certificate that is the result of a malicious redirection or a fraudulent local certificate. In one embodiment, if SSL certificate 146 is verified ("YES"), from VERIFIED check operation 214, processing transitions to RELEASE SSL CERTIFICATE operation 228, earlier described.

Referring back again to VERIFIED check operation 214, alternatively, in one embodiment, if SSL certificate 146 is not verified ("NO"), processing transitions from VERIFIED check operation 214 to a TAKE PROTECTIVE ACTION operation 216.

In TAKE PROTECTIVE ACTION operation 216, one or more protective actions are taken. For example, in one embodiment, an alert notification is generated and provided to the user and/or to another application, for example, indicating the returned SSL certificate may indicate a fraudulent local certificate, or may indicate a malicious redirection to another web site. From TAKE PROTECTIVE ACTION operation 216, processing transitions to EXIT operation 230, with processing exiting method 200, or optionally returns to operation 204 on interception of a next returned SSL certificate.

In the above embodiment, when a returned SSL certificate cannot be verified when compared to locally stored certificate information obtained from trusted local cache 144, it is assumed that the SSL certificate is indicative of malicious activity, such as a fraudulent local certificate or a malicious redirection, and protective action is taken. In some instances, the reason for verification failure with the locally stored certificate information of the trusted local cache may instead be from a legitimate change in the SSL certificate, such as an update to the SSL certificate which was not yet stored to trusted local cache 144.

Thus, in another embodiment, further described herein with reference to FIG. 3 and method 300, when a returned SSL certificate is not verified when compared to a corresponding entry in trusted local cache 144, one or more remote trusted source(s) are queried to obtain remotely stored certificate information corresponding to the returned SSL certificate, and an additional verification is performed. This permits a returned SSL certificate that is legitimate, yet not verified when compared to the trusted local cache, to obtain verification and release for completion, and optionally, allows the trusted local cache entry to be updated to reflect the new certificate information.

FIG. 3 illustrates a flow diagram of a method 300 for detecting fraudulent redirects and/or fraudulent local certificates in accordance with another embodiment of the invention. Referring now to FIGS. 1 and 3 together, in one embodiment, execution of credential manager application 106 by processor 108 results in the operations of method 300 as described below. Method 300 is entered at an ENTER operation 302 with processing transitioning to INTERCEPT SSL CERTIFICATE operation 204 as earlier described herein with reference to FIG. 2 and method 200.

In the present embodiment, operations 204, 206, 208, 210, 212, and 214, are performed as earlier described with reference to FIG. 2 and method 200, hereby incorporated by reference. Further, referring to TRUSTED LOCAL CACHE ENTRY check operation 210, where a corresponding entry is not found in trusted local cache 144, operations 218, 220, 222, 224, 226, 228, and 216 are performed as earlier described with reference to FIG. 2 and method 200, hereby incorporated by reference.

Differently, in one embodiment, at VERIFIED check operation 214, upon a determination that the certificate information obtained in operation 206 is not verified when compared to locally stored certificate information obtained from trusted local cache 144 ("NO"), processing transitions from VERIFIED check operation 214 to QUERY REMOTE TRUSTED SOURCE(S) operation 218 with a second verification process performed using remotely stored certificate information obtained from the one or more of the remote trusted sources, e.g., from remote trusted source computer system 142 and/or one or more of remote trusted peer computer systems 146A-146N.

In QUERY REMOTE TRUSTED SOURCE(S) operation 218, one or more remote trusted sources are queried to obtain remotely stored certificate information corresponding to the SSL certificate, e.g., SSL certificate 146, as earlier described. From QUERY REMOTE TRUSTED SOURCE(S) operation 218, processing transitions to a REMOTELY STORED ENTRY check operation 220.

In REMOTELY STORED ENTRY check operation 220, a determination is made whether or not an entry corresponding to returned SSL certificate 146 is present in one or more remote trusted sources, such as in a cache of remote trusted source computer system 142 and/or one or more of remote trusted peer computer systems 146A-146N. For example, in one embodiment, a determination is made whether or not an entry having a URL that matches the URL of SSL certificate 146 is present in remote trusted source computer system 142 and/or remote trusted peer computer systems 146A-146N.

In one embodiment, if an entry corresponding to SSL certificate 146 is not present in remote trusted source computer system 146 and/or one or more of remote trusted peer computer systems 146A-146N ("NO"), as the entry was not verifiable when compared to an entry in trusted local cache 144, in one embodiment, SSL certificate is assumed to be indicative of malicious activity and processing transitions from REMOTELY STORED ENTRY check operation 220 to TAKE PROTECTIVE ACTION operation 216, earlier described. Alternatively, in one embodiment if an entry corresponding to SSL certificate 146 is present in remote trusted source computer system 146 and/or one or more of remote trusted peer computer systems 146A-146N ("YES"), from REMOTELY STORED ENTRY check operation 220 processing transitions to an OBTAIN REMOTELY STORED CERTIFICATE INFORMATION operation 222.

In OBTAIN REMOTELY STORED CERTIFICATE INFORMATION operation 222, the remotely stored certificate information corresponding to the SSL certificate is obtained from one or more of remote trusted sources, e.g., remote trusted source computer system 142 and/or one or more of remote trusted peer computer system 146A-146N, as earlier described. From OBTAIN REMOTELY STORED CERTIFICATE INFORMATION operation 222, processing transitions to VERIFIED check operation 224.

In VERIFIED check operation 222, a determination is made whether or not the certificate information associated with returned SSL certificate matches, or is otherwise verifiable by, the remotely stored certificate information obtained in operation 220 as earlier described.

In one embodiment, if the certificate information associated with returned SSL certificate 146 matches, or is otherwise verifiable by, the remotely stored certificate information obtained from the remote trusted source(s), SSL certificate 146 is verified and is assumed not to be the result of a malicious redirection and/or not a fraudulent local certificate. Alternatively, in one embodiment, if the certificate information associated with returned SSL certificate 146 does not match, or is otherwise not verifiable by, the remotely stored certificate information obtained from the remote trusted source(s), SSL certificate 146 is not verified and is assumed to be the result of a malicious redirection and/or a fraudulent local certificate. If the SSL certificate, e.g., SSL certificate 146, is not verified ("NO"), from VERIFIED check operation 224, processing transitions to TAKE PROTECTIVE ACTION operation 216 as earlier described.

Referring again to VERIFIED check operation 224, alternatively, if the SSL certificate, e.g., SSL certificate 146, is verified ("YES"), from VERIFIED check operation 224, processing transitions to STORE CERTIFICATE INFORMATION IN TRUSTED LOCAL CACHE operation 226.

In STORE CERTIFICATE INFORMATION IN TRUSTED LOCAL CACHE OPERATION 226, an entry associated with the SSL certificate is generated and stored in trusted local cache 144. In one embodiment, a new entry including the remotely stored certificate information is generated and stored in trusted local cache 144 with the existing entry, e.g., the outdated entry, being deleted. In another embodiment, rather than generating a new entry, the existing locally stored certificate information in the trusted local cache associated with the SSL certificate is updated to reflect the remotely stored certificate information obtained in operation 220. From STORE CERTIFICATE INFORMATION IN TRUSTED LOCAL CACHE operation 226, processing transitions to RELEASE SSL CERTIFICATE operation 228.

In RELEASE SSL CERTIFICATE operation 228, the SSL certificate, e.g., SSL certificate 146, is released as earlier described with processing exiting method 300 at an EXIT operation 304, or returning to operation 204 of FIG. 3 upon receipt of a next SSL certificate.

Figure 4:
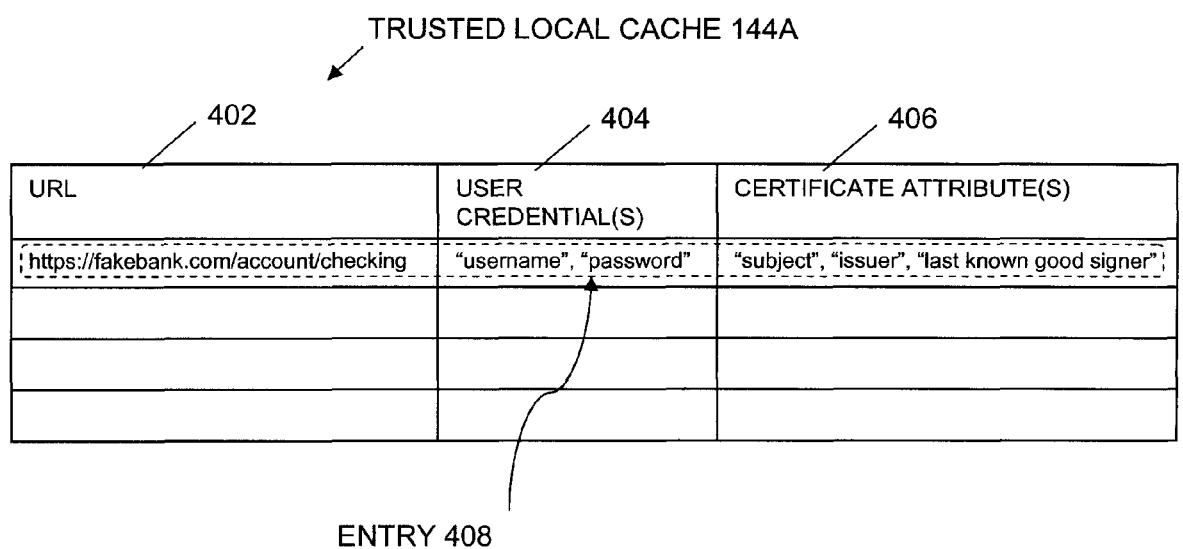
FIG. 4 illustrates one example of a trusted local cache generated and maintained by the credential manager application of FIG. 1 in accordance with one embodiment of the invention.

FIG. 4 illustrates one example of a trusted local cache 144A generated and maintained by credential manager application 106 in accordance with one embodiment of the invention. As illustrated in FIG. 4, in one embodiment, trusted local cache 144A includes individual entries corresponding to separate SSL certificates. For example, in one embodiment, entry 408 in trusted local cache 144A includes certificate information such as a URL 402, e.g., https://www.fakebank.com/account/checking; one or more user credentials 404, e.g., a username and a password; and, one or more certificate attributes 406, e.g., a subject, an issuer, and a last known good signer. In other embodiments, trusted local cache 144A can contain more, fewer, and/or different credential information.

Herein although method 200 and method 300 are described as performed prior to receipt of SSL certificate 146 by web browser 114, in other embodiments, method 200 and method 300 can instead be performed in parallel with processing of SSL certificate 146 by web browser 114. In these embodiments, for example, SSL certificate 146 is released to web browser 114 after obtaining the certificate information, and if protective action is required in accordance with embodiments of the invention, the web browser processes can be terminated. In still other embodiments, method 200 and method 300 can by-pass the check of SSL certificate 146 by web browser 114.

Further herein, although trusted local cache 144 is described as updated in conjunction with the verification process of a received certificate, in some embodiments, trusted local cache 144 is updatable, such are periodically, with one or more of the remote trusted sources, e.g., remote trusted source computer system 142 and/or remote trusted peer computer systems 146A.

FIG. 5 illustrates a flow diagram of a method 500 for automatically logging-in to a web site utilizing user credentials stored in trusted local cache 144 in accordance with another embodiment of the invention. Referring now to FIGS. 1 and 5 together, in one embodiment, execution of credential manager application 106 by processor 108 results in the operations of method 500 as described below. Method 500 is entered at an ENTER operation 502 with processing transitioning to an INTERCEPT USER LOG-IN PAGE operation 504.

In INTERCEPT LOG-IN PAGE operation 504, a user log-in page received from a web site is automatically intercepted prior to display to a user on host computer system 102. The user log-in page can be intercepted using any of a wide variety of intercept mechanisms well known to those of skill in the art, such as by utilizing proxy or hooking techniques. From INTERCEPT LOG-IN PAGE operation 504, processing transitions to a CONSTRUCT DOM object operation 506.

In CONSTRUCT DOM OBJECT operation 506, a Document Object Model (DOM) object is automatically constructed including the log-in page. In one embodiment, the DOM object includes the log-in page having user credential fields for input of the user's credentials required for log-in, such as a username field and a password field. From CONSTRUCT DOM OBJECT operation 506, processing transitions to an OBTAIN USER CREDENTIALS operation 508.

In OBTAIN USER CREDENTIALS operation 508, the user's credentials associated with log-in to the web site are automatically obtained from trusted local cache 144. For example, in one embodiment, credential manager application 106 locates an entry corresponding to the web site, for example, identified by a matching URL, stored in trusted local cache 144. The user's credentials needed for log-in to the web site are obtained from the locally stored certificate information of the entry in trusted local cache 144. From OBTAIN USER CREDENTIALS operation 508, processing transitions to an EMBED USER CREDENTIALS IN DOM OBJECT operation 510.

In EMBED USER CREDENTIALS IN DOM OBJECT operation 510, the user credentials obtained in operation 508 are automatically embedded into the appropriate fields of the DOM object constructed in operation 506. From EMBED USER CREDENTIALS IN DOM OBJECT operation 510, processing transitions to a SUBMIT LOG-IN FORM operation 512.

In SUBMIT LOG-IN FORM operation 512, the DOM object having the completed log-in form including the user credentials required for log-in is automatically submitted to the web site. In one embodiment, the DOM object having the log-in form including the user credentials is automatically submitted to the web site in a newly created window.

In one embodiment, the submission is implemented by a single click by the user from a list of enrolled sites (not shown) maintained by credential manager 106. From SUBMIT LOG-IN FORM operation 512, processing optionally transitions to an EXIT operation 514 with processing exiting method 500, optionally transitions to operation 204 of method 200 (FIG. 2), at operation 516, or optionally transitions to operation 204 of method 300 (FIG. 3), at operation 518.

Referring again to FIG. 1, credential manager application 106 is in computer memory 112. As used herein, a computer memory refers to a volatile memory, a non-volatile memory, or a combination of the two. Although credential manager application 106 is referred to as an application, this is illustrative only. Credential manager application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a host configuration, an embodiment of the present invention may be carried out using any suitable means and/or hardware configuration involving a personal computer, a workstation, a portable device, or a network of computer devices. Other network configurations other than host configurations, e.g., client-server, peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a non-transitory computer program product comprises a tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, credential manager application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionalities in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionalities of credential manager application 106 in accordance with the embodiments of the present invention can be implemented in a wide variety of computer system configurations. In addition, the functionalities of credential manager application 106 could be stored as different modules in memories of different devices. For example, credential manager application 106 could initially be stored in server computer system 130, and then as necessary, a portion of credential manager application 106 could be transferred to host computer system 102 and executed on host computer system 102. Consequently, part of the functionality of credential manager application 106 would be executed on processor 134 of server computer system 130, and another part would be executed on processor 108 of host computer system 102.

In view of this disclosure, those of skill in the art can implement various embodiments of the present invention in a wide-variety of physical hardware configurations using an operating system and computer programming language of interest to the user. In yet another embodiment, credential manager application 106 is stored in memory 136 of server computer system 130. Credential manager application 106 is transferred over network 126 to memory 112 in host computer system 102. In this embodiment, network interface 138 and I/O interface 110 would include analog modems, digital modems, or a network interface card. If modems are used, network 126 includes a communications network, and credential manager application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
    executing on a host computer system a credential manager application, wherein the executing includes:
        intercepting, by the executing credential manager application on the host computer system, an SSL certificate received on the host computer system,
            wherein the SSL certificate is intercepted prior to receipt by a web browser on the host computer system, and
            wherein the SSL certificate is returned from a web site in response to communication from the host computer system;
        obtaining, on the host computer system by the executing credential manager application, certificate information associated with said SSL certificate,
            wherein said certificate information comprises:
                a Uniform Resource Locator (URL) associated with a web site providing the SSL certificate;
                at least one user credential of a user, wherein the user is a user of the host computer system; and
                at least one certificate attribute of the SSL certificate;
        querying a trusted local cache, on the host computer system by the executing credential manager application, for locally stored certificate information corresponding to said SSL certificate,
            wherein said locally stored certificate information comprises:
                a Uniform Resource Locator (URL) associated with a web site providing the SSL certificate;
                at least one user credential of a user, wherein the user is a user of the host computer system; and
                at least one certificate attribute of the SSL certificate;
        determining, on the host computer system by the executing credential manager application, whether said locally stored certificate information is present in said trusted local cache;
        wherein upon a determination that said locally stored certificate information is present in said trusted local cache, obtaining, on the host computer system by the executing credential manager application, said locally stored certificate information;
        performing a first comparison, on the host computer system by the executing credential manager application, said first comparison comparing at least said at least one user credential and said at least one certificate attribute with corresponding information in said locally stored certificate information;
        determining, on the host computer system by the executing credential manager application, whether said SSL certificate is verified based upon said first comparison;
        wherein upon a determination that said SSL certificate is verified, releasing said SSL certificate; and
        wherein upon a determination that said SSL certificate is not verified, taking protective action on the host computer system as the SSL certificate is indicative of malicious activity and so is indicative of a malicious attack; and
        wherein the protective action includes sending an alert of the malicious activity by the executing credential manager application.

2. The computer-implemented method of claim 1 further comprising:
    wherein upon a determination that said locally stored certificate information is not present in said trusted local cache, querying at least one remote trusted source for remotely stored certificate information corresponding to said SSL certificate;
    obtaining said remotely stored certificate information;
    comparing at least a portion of said certificate information with at least a portion of said remotely stored certificate information;
    determining whether said SSL certificate is verified based upon said comparing said at least a portion of said certificate information with said at least a portion of said remotely stored certificate information;
    wherein upon a determination that said SSL certificate is verified, storing said certificate information as an entry corresponding to said SSL certificate in said trusted local cache, and
    releasing said SSL certificate; and
    wherein upon a determination that said SSL certificate is not verified, taking said protective action.

3. The computer-implemented method of claim 1 further comprising:
    prior to taking said protective action, querying at least one remote trusted source for remotely stored certificate information corresponding to said certificate information;
    obtaining said remotely stored certificate information;
    performing a second comparison, said second comparison comparing at least a portion of said certificate information with at least a portion of said remotely stored certificate information;
    determining whether said SSL certificate is verified based upon said second comparison;
    wherein upon a determination that said SSL certificate is verified based upon said second comparison, releasing said SSL certificate; and
    wherein upon a determination that said SSL certificate is not verified, taking said protective action.

4. The computer-implemented method of claim 3 further comprising:
    wherein upon a determination that said SSL certificate is verified based upon said second comparison, updating said locally stored certificate information in said trusted local cache to include said remotely stored certificate information.

5. The computer-implemented method of claim 1 further comprising:
    intercepting a log-in form from a web site prior to display to a user on a host computer system, said log-in form including one or more user credential fields for input of one or more requested user credentials;
    automatically constructing a document object model (DOM) object including said log-in form and said one or more user credential fields;

automatically obtaining one or more stored user credentials from the trusted local cache, said stored user credentials corresponding to said one or more user credential fields;

automatically embedding said one or more stored user credentials in said one or more user credential fields in said DOM; and automatically submitting said DOM to said web site, said DOM including said one or more stored user credentials.

6. The computer-implemented method of claim 1 wherein said trusted local cache includes one or more entries, each entry including locally stored certificate information corresponding to an associated SSL certificate.

7. The computer-implemented method of claim 2 wherein said remotely stored certificate information comprises:
   a Uniform Resource Locator (URL) associated with a web site;
   at least one user credential; and
   at least one certificate attribute.

8. The computer-implemented method of claim 1 wherein said user credential is selected from the group consisting of a username and a password.

9. The computer-implemented method of claim 1 wherein said at least one certificate attribute is selected from the group consisting of a subject, an issuer, and a last known good signer.

10. The computer-implemented method of claim 2 wherein said at least one remote trusted source utilizes a certificate signed by a known specific root.

11. The computer-implemented method of claim 2 wherein said at least one remote trusted source is one or more remote trusted peer computer systems.

12. A computer-program product comprising a non-transitory tangible computer readable medium containing computer program code comprising:
   a credential manager application, said credential manager application for intercepting, on the host computer system, an SSL certificate received on a host computer system,
      wherein the SSL certificate is intercepted prior to receipt by a web browser on the host computer system, and
      wherein the SSL certificate is returned from a web site in response to communication from the host computer system;
   said credential manager application further for obtaining, on the host computer system, certificate information associated with said SSL certificate,
      wherein said certificate information comprises:
         a Uniform Resource Locator (URL) associated with a web site providing the SSL certificate;
         at least one user credential of a user, wherein the user is a user of the host computer system; and
         at least one certificate attribute of the SSL certificate;
   said credential manager application further for querying, on the host computer system, a trusted local cache for locally stored certificate information corresponding to said SSL certificate,
      wherein said locally stored certificate information comprises:
         a Uniform Resource Locator (URL) associated with a web site providing the SSL certificate;
         at least one user credential of a user, wherein the user is a user of the host computer system; and
         at least one certificate attribute of the SSL certificate;
   said credential manager application further for determining, on the host computer system, whether said locally stored certificate information is present in said trusted local cache;
      wherein upon a determination that said locally stored certificate information is present in said trusted local cache, said credential manager application further for obtaining, on the host computer system, said locally stored certificate information;
   said credential manager application further for performing a first comparison on the host computer system, said first comparison comparing at least said at least one user credential and said at least one certificate attribute with corresponding information in said locally stored certificate information;
   said credential manager application further for determining, on the host computer system, whether said SSL certificate is verified based upon said first comparison;
      wherein upon a determination that said SSL certificate is verified, said credential manager application further for releasing said SSL certificate; and
      wherein upon a determination that said SSL certificate is not verified, said credential manager application further for taking protective action on the host computer system as the SSL certificate is indicative of malicious activity and so is indicative of a malicious attack, wherein the protective action includes sending an alert of the malicious activity by the credential manager application.

13. The non-transitory computer-program product of claim 12 further comprising:
   wherein upon a determination that said locally stored certificate information is not present in said trusted local cache, said credential manager application further for querying at least one remote trusted source for remotely stored certificate information corresponding to said SSL certificate;
   said credential manager application further for obtaining said remotely stored certificate information;
   said credential manager application further for comparing at least a portion of said certificate information with at least a portion of said remotely stored certificate information;
   said credential manager application further for determining whether or not said SSL certificate is verified based upon said comparing said at least a portion of said certificate information with said at least a portion of said remotely stored certificate information;
   wherein upon a determination that said SSL certificate is verified, said credential manager application further for storing said certificate information as an entry corresponding to said SSL certificate in said trusted local cache, and
   said credential manager application further for releasing said SSL certificate; and
   wherein upon a determination that said SSL certificate is not verified, said credential manager application further for taking said protective action.

14. The non-transitory computer-program product of claim 12 further comprising:
   prior to taking said protective action, said credential manager application further for querying at least one remote trusted source for remotely stored certificate information corresponding to said certificate information;
   said credential manager application further for obtaining said remotely stored certificate information;

said credential manager application further for performing a second comparison, said second comparison comparing at least a portion of said certificate information with at least a portion of said remotely stored certificate information;

said credential manager application further for determining whether or not said SSL certificate is verified based upon said second comparison;

wherein upon a determination that said SSL certificate is verified based upon said second comparison, said credential manager application further for releasing said SSL certificate; and wherein upon a determination that said SSL certificate is not verified, said credential manager application further for taking said protective action.

15. The non-transitory computer-program product of claim 14 further comprising:

wherein upon a determination that said SSL certificate is verified based upon said second comparison, said credential manager application further for updating said locally stored certificate information in said trusted local cache to include said remotely stored certificate information.

16. The non-transitory computer-program product of claim 12 further comprising:

said credential manager application further for intercepting a log-in form from a web site prior to display to a user on a host computer system, said log-in form including one or more user credential fields for input of one or more requested user credentials;

said credential manager application further for automatically constructing a document object model (DOM) object including said log-in form and said one or more user credential fields;

said credential manager application further for automatically obtaining one or more stored user credentials from the trusted local cache, said stored user credentials corresponding to said one or more user credential fields;

said credential manager application further for automatically embedding said one or more stored user credentials in said one or more user credential fields in said DOM; and said credential manager application further for automatically submitting said DOM to said web site, said DOM including said one or more stored user credentials.

* * * * *